(12) United States Patent
Boukobza

(10) Patent No.: US 9,336,256 B2
(45) Date of Patent: May 10, 2016

(54) METHOD, APPARATUS, AND COMPUTER-READABLE MEDIUM FOR DATA TOKENIZATION

(71) Applicant: Informatica LLC, Redwood City, CA (US)

(72) Inventor: Eric Boukobza, Tel Aviv (IL)

(73) Assignee: Informatica LLC, Redwood City, CA (US)

( * ) Notice: Subject to any disclaimer, the term of this patent is extended or adjusted under 35 U.S.C. 154(b) by 99 days.

(21) Appl. No.: 13/840,446

(22) Filed: Mar. 15, 2013

(65) Prior Publication Data

US 2014/0280260 A1    Sep. 18, 2014

(51) Int. Cl.
*G06F 7/00*     (2006.01)
*G06F 17/30*    (2006.01)

(52) U.S. Cl.
CPC ................. *G06F 17/30345* (2013.01)

(58) Field of Classification Search
CPC ........ G06F 21/604; G06F 21/602; H04L 9/00
USPC ........................................ 707/757; 713/150
See application file for complete search history.

(56) References Cited

U.S. PATENT DOCUMENTS

| | | | |
|---|---|---|---|
| 6,052,687 A * | 4/2000 | Miura et al. | |
| 8,380,630 B2 | 2/2013 | Felsher | |
| 8,458,487 B1 * | 6/2013 | Palgon et al. | 713/185 |
| 2003/0101341 A1 | 5/2003 | Kettler, III et al. | |
| 2004/0139043 A1 * | 7/2004 | Lei et al. | 707/1 |
| 2005/0086256 A1 | 4/2005 | Owens et al. | |
| 2005/0223222 A1 | 10/2005 | Graves et al. | |
| 2005/0240745 A1 * | 10/2005 | Iyer et al. | 711/167 |
| 2011/0131643 A1 | 6/2011 | Lawrence et al. | |
| 2011/0196955 A1 | 8/2011 | Odaka et al. | |
| 2013/0191650 A1 * | 7/2013 | Balakrishnan et al. | 713/190 |
| 2014/0013452 A1 * | 1/2014 | Aissi et al. | 726/30 |

FOREIGN PATENT DOCUMENTS

WO    0246861 A2    6/2002

OTHER PUBLICATIONS

International Search Report and Written Opinion cited in corresponding International Application No. PCT/US2014/027896 dated Aug. 19, 2014.

* cited by examiner

*Primary Examiner* — Charles Lu
(74) *Attorney, Agent, or Firm* — Marc S. Kaufman; Amardeep S. Grewal; Reed Smith LLP

(57) ABSTRACT

An apparatus, computer-readable medium, and computer-implemented method for data tokenization are disclosed. The method includes receiving, at a database network router, a database access request directed to a tokenized database, the tokenized database containing one or more tokenized data values, applying one or more rules to the request, rewriting the request based on at least one of the one or more rules, such that data values being added to the database will be tokenized data values, and data values received from the database will be non-tokenized data values, and transmitting the rewritten request to the database.

24 Claims, 11 Drawing Sheets

METHOD, APPARATUS, AND COMPUTER-READABLE MEDIUM FOR DATA TOKENIZATION

BACKGROUND

Large amounts of data are stored in databases, such as enterprise databases. Much of this data includes confidential or otherwise sensitive information. As a result, enterprises often utilize tokenization to hide the values of potentially sensitive data in their databases. This tokenization process can consist of replacing the data values in a database with token values. The token-to-data value relationship may be stored in a vault, which may be encrypted to prevent unauthorized access and ensure that only permitted users may access the real values of the tokens in the database. Alternatively, rather than storing the real data values in the token vault, the token vault may be used to extract a real data value that is embedded in a token via a decryption process.

When an authorized user wishes to access the data in the database from an application, that application has the responsibility of identifying the authorized user, and replacing the tokens with the real values. Additionally, if an authorized user wishes to add new data to the database, the application has the responsibility of tokenizing the new data prior to adding it to the database. This places additional burdens on the application and requires the application to be in communication with the token vault, as well as the database. For example, if the user enters a data value to add to the database, the application first has to tokenize the data value, then add the token-to-data values relationship to the vault, and then transmit the tokenized data value to the database.

As a result of being responsible for most of the tasks related to tokenization, the application must be heavily customized in order to integrate the particular tokenization Application Programming Interface (API) used by each database provider, and cannot be utilized with the APIs of other database providers or tokenization providers.

DETAILED DESCRIPTION

While methods, apparatuses, and computer-readable media are described herein by way of examples and embodiments, those skilled in the art recognize that methods, apparatuses, and computer-readable media for data tokenization are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

Figure 1A:
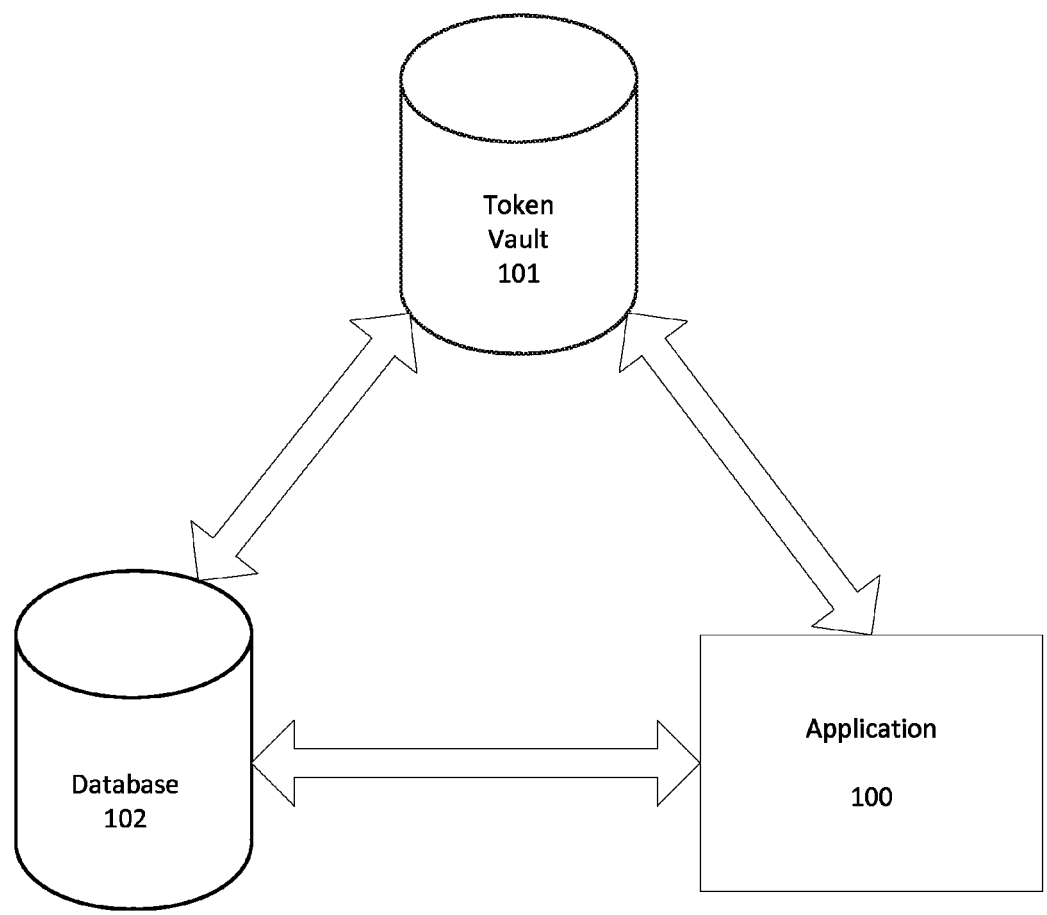
FIG. 1A is a system diagram showing the arrangement of system components and the interactions between the components in prior tokenization schemes.

FIG. 1A is a system diagram showing the arrangement of components in prior tokenization schemes and the interactions between the components. Database 102 is a tokenized database which stores data in a tokenized format. The token-to-data relationships may be stored in the token vault 101. Application 100 has bi-directional communications with token vault 101 and database 102 storing tokenized data. So, for example, if a user wants to query the tokenized database 102, the application 100 must first tokenize any filter values in the query, send the query to the database 102 to retrieve the token values which satisfy the query, and then retrieve the real values corresponding to the token values from the token vault 101. Similarly, if the user wants to update the database, the application 100 must tokenize the new data values and send them to the token vault 101, in addition to sending them to tokenized database 102.

Applicants have discovered a system for moving the tokenization responsibilities out of the application and to an intermediary node that reduces required resources and simplifies implementation. This change would allow database providers to utilize any application with their tokenized database without having to customize the application to meet the needs of the particular tokenization API. Additionally, the intermediary node could be utilized to serve multiple database providers with different tokenization technologies.

Figure 1B:
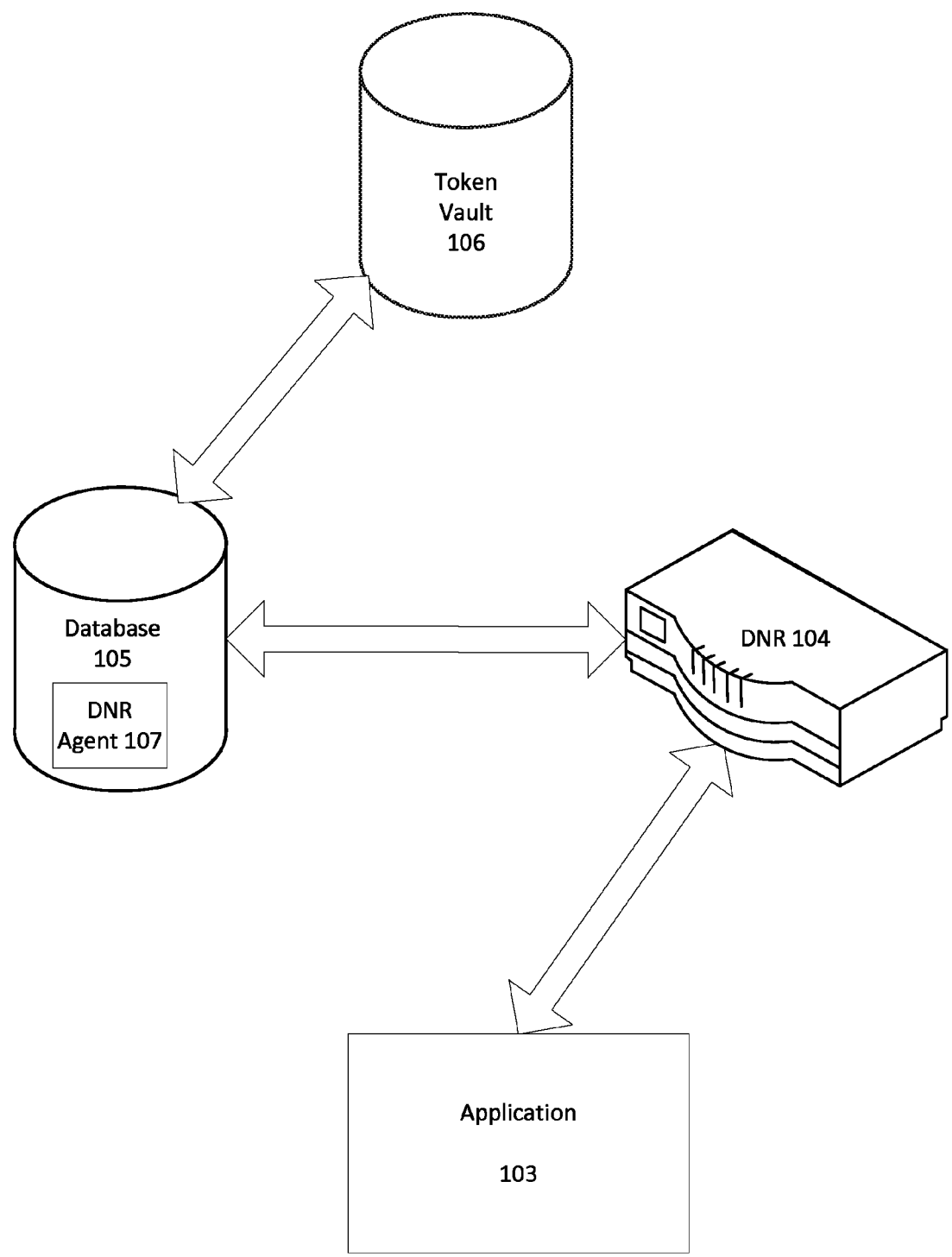
FIG. 1B is an exemplary apparatus for data tokenization according to a disclosed embodiment.

Referring to FIG. 1B, an exemplary apparatus for performing the above-mentioned tasks and tokenizing data is shown according to a disclosed embodiment. The database network router ("DNR") 104 serves as the above-mentioned intermediary node between the application 103 and the tokenized database 105. The database 105 communicates directly with token vault 106 through the use of a DNR software agent 107 running on the database which parses and executes commands received as part of database access requests from the DNR 104. Through the use of the DNR 104 and the DNR software agent 107, the application 103 can be decoupled from the database 105, and the burden of integrating tokenization APIs and performing tokenization or de-tokenization functions can be shifted to the DNR 104 and the DNR software agent 107. Additionally, by removing the tokenization and de-tokenization functions from the application, multiple tokenization vendors or companies can utilize the DNR and a DNR software agent as the interface between their own databases and applications.

Figure 2:
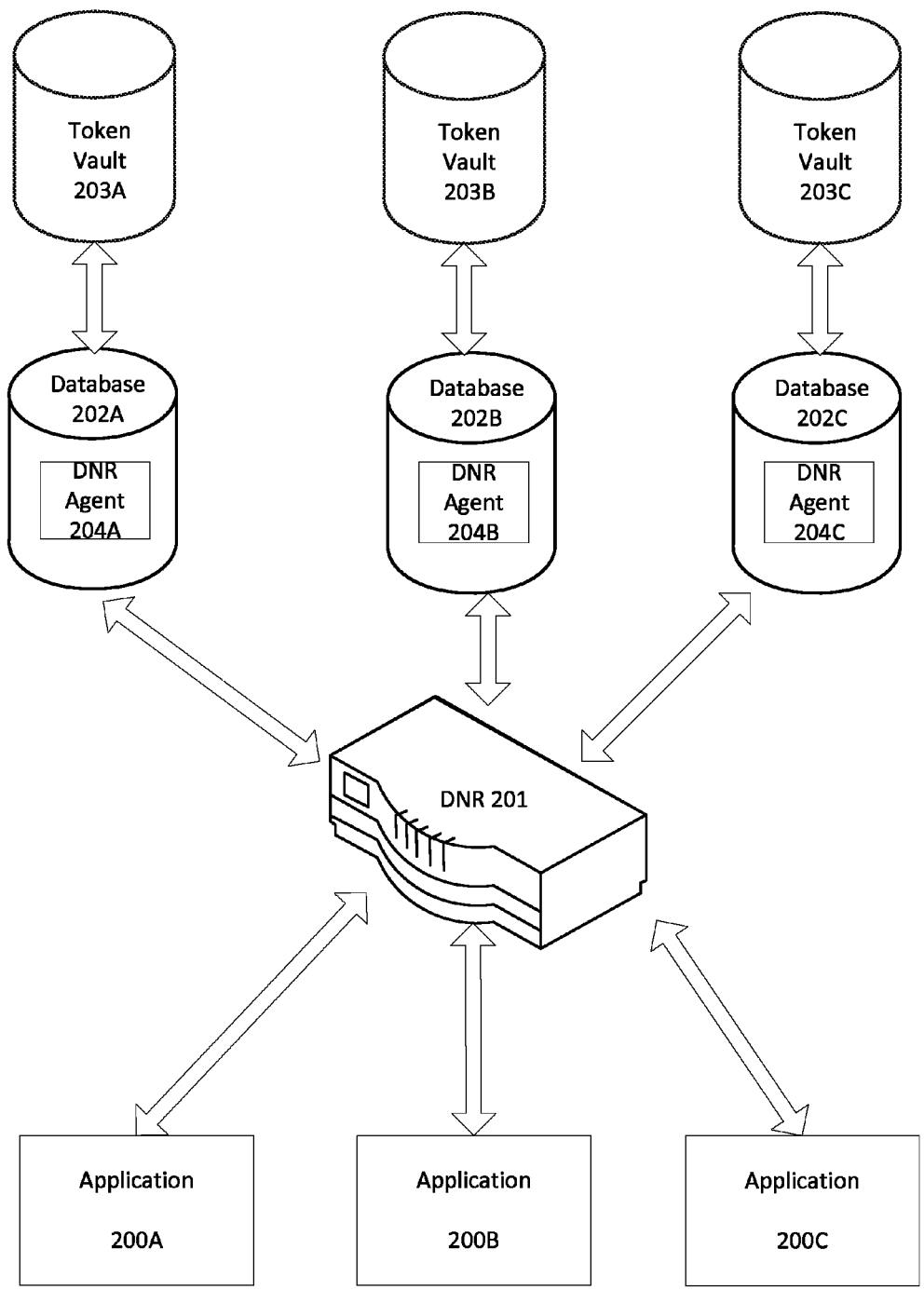
FIG. 2 is an exemplary apparatus for data tokenization with multiple databases, applications, and tokenization schemes according to a disclosed embodiment.

An example of how the DNR can be used with multiple databases is shown in FIG. 2. Applications 200A, 200B, and 200C may be executing on different client machines (not shown), and may be associated with three different tokenized databases 202A, 202B, and 202C. A DNR software agent running on each of the databases, 204A, 204B, and 204C, communicates with each of the respective token vaults, 203A, 203B, and 203C. Of course, a separate token vault is not required for each database. For example, the databases 202B and 202C can use the same tokenization scheme and can share a single token vault.

The DNR 201 can receive or intercept a request from application 200A and based on the application, client machine, user credentials, request destination, request contents, or some other parameter, determine that the request is associated with database 202A. The request can then be processed in accordance with the rules associated with database 202A, as will be described below, and forwarded on to the database 202A. At the database 202A, the DNR Agent 204A may determine that some data value needs to be tokenized, or some tokenized value needs to be de-tokenized, at which point it can communicate with the token vault 203A to perform the appropriate operation prior to returning any results to the DNR 201 and eventually to the Application 200A.

Figure 3:
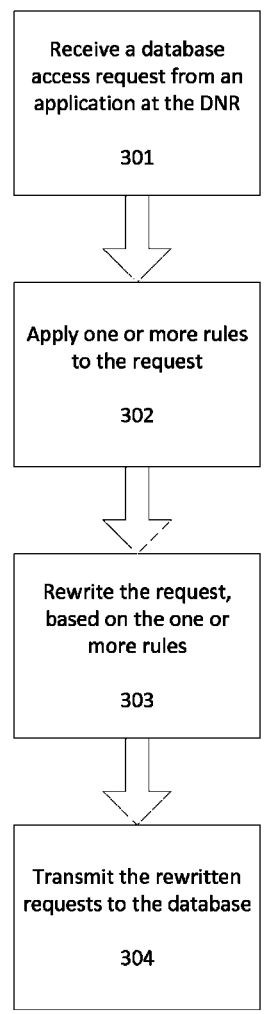
FIG. 3 is a flowchart showing an exemplary method for handling database access requests by the database network router (DNR) according to a disclosed embodiment.

With reference to FIG. 3, a method of handling database access requests by the DNR of a disclosed embodiment will now be described. At step 301, the DNR receives a database access request from an application. The request can be directed to a target database and re-routed to the DNR, or the request can be intercepted by the DNR. Alternatively, the request can be sent to the DNR but specify a destination database. Many variations are possible for receiving the database access request at the DNR.

The database access request can include any type of request, including a data retrieval request, a data update request, a data insert request, a data delete request, or other similar database access requests. Additionally, the language of the request can include any type of database query language, including Structured Query Language (SQL), Contextual Query Language (CQL), XQuery, YQL, Datalog, OQL, RDQL, and many others.

At step 302, the DNR can apply one or more rules to the request. These rules will be discussed in greater detail below, but can include rules relating to the proper handling of different types of database access requests, request routing, tokenization rules, and the like. After applying the rules, the request can be rewritten at step 303, based on at least one of the one or more of the rules. For example, the request can be rewritten to add one or more commands to the database access request which will be parsed and executed by the DNR agent running on the database. Additionally, one or more parameters can be passed to the DNR agent with the commands to instruct the DNR agent on how to handle the data that is passed with the commands. For example, parameters can specify specific tokenization schemes to use, authorization of a particular user or machine, whether the command should be ignored, or whether false values should be returned.

After the request is rewritten using one or more rules, the rewritten request can be transmitted to the destination database at step 304. The actual transmission of the rewritten request can also be based on one or more rules. For example, the destination database may be a distributed database striped across a plurality of repositories. The DNR may apply a rule to the database access request or its contents to determine which one of the repositories the request should be forwarded to. Similarly, if the DNR is routing requests for multiple different databases with different tokenization schemes, the DNR may need to apply rules to determine the correct database to send the rewritten request to. Alternatively, if the DNR intercepts a request that already specifies a destination database, the DNR can simply transmit the rewritten request to that destination database.

Figure 4:
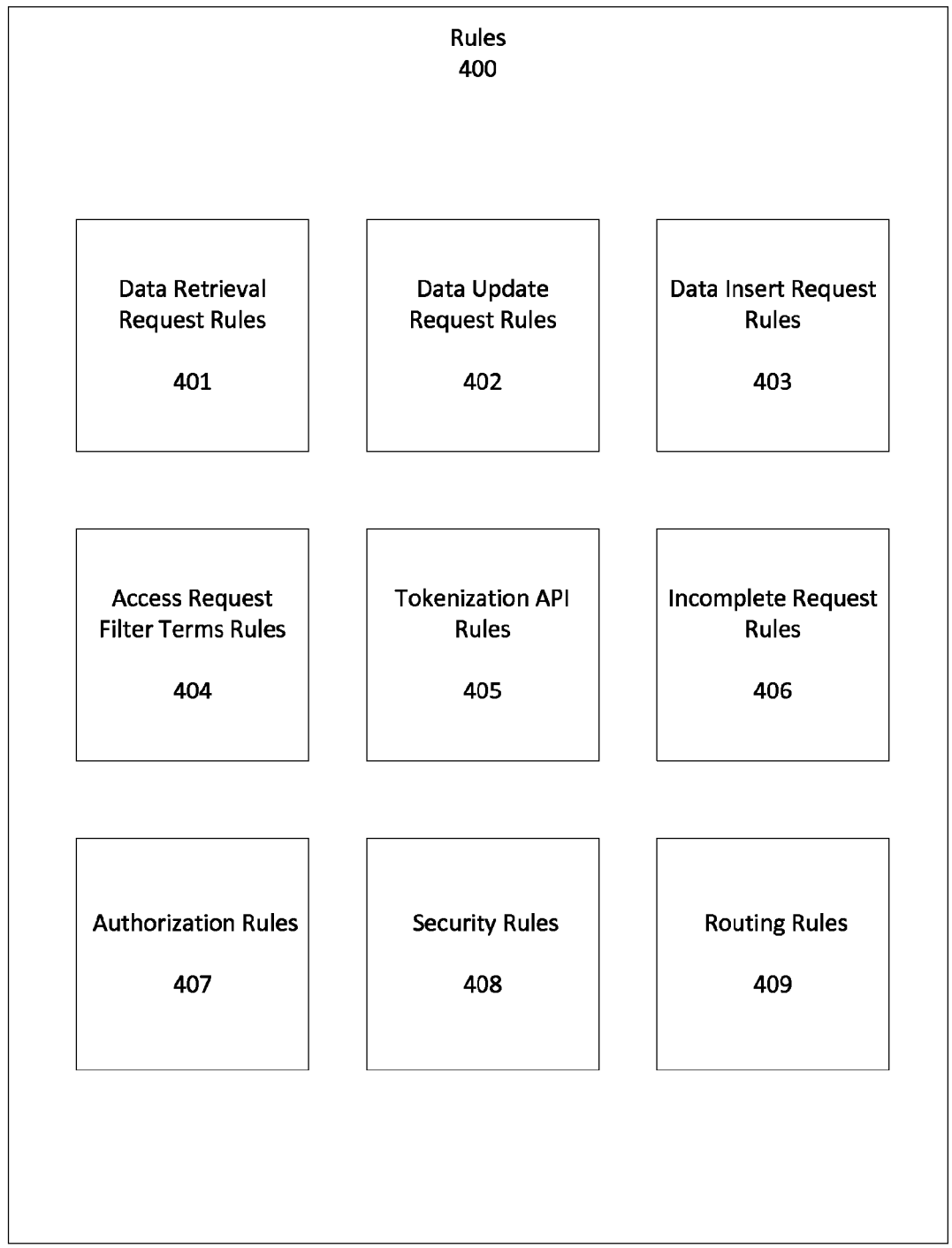
FIG. 4 is a diagram showing many of the rules and rule sets that can be applied to the request by the DNR according to a disclosed embodiment.

FIG. 4 illustrates some possible rules and rule sets 400 that can be applied to the request. The DNR can apply a set of rules based on the type of request that is received, such as data retrieval request rules 401, data update request rules 402, and data insert request rules 403. Additionally, although they are not shown, the DNR can also apply rule sets relating to data delete requests. In practice, these would be similar to data update requests. Filter terms rules 404 can be applied when the access request includes one or more filter terms. For example, a SQL query may state "select variable A where variable B=X." The where clause and related information are the filter terms, and a set of rules may be used to determine how to handle the filter terms.

For example, filter terms may include non-tokenized data that requires tokenization after it is passed to the DNR agent executing on the database. However, the tokenization API may specify that a new token should not be created for data values that are passed as filter data values, but rather that the token value (if one exists) should be looked up in a token vault. As discussed further below, the filter terms rules can be used to insert a parameter into a tokenization command that lets the DNR agent know that it should tokenize a passed value but that it should not create a new token in the process.

Tokenization API rules 405 relate to the different rules that are used for retrieving data from or sending data to tokenized databases having a variety of tokenization schemes. For example, a first request may be directed to a first database that uses a first tokenization algorithm to tokenize all data values stored therein, and a second request may be directed to a second database that uses a second tokenization algorithm to tokenize only sensitive data stored therein. So, for example, if the DNR receives a data retrieval request directed to the second database, it can consult the associated tokenization API rules for that database and determine whether or not the requested data is stored in token format. If it is, then the DNR can insert a de-tokenize command into the request, and if it is not, then the de-tokenize command is unnecessary.

Tokenization API rules 405 can specify what types of data or data fields should be tokenized. For example, one tokenization API may specify that all data should be tokenized, while another tokenization API may specify that only data fields that contain personal or confidential information should be tokenized.

Incomplete request rules 406 will also be discussed in greater detail below, and can be applied when the DNR receives a request that is missing specific fields or any other necessary information.

Authorization rules 407 and security rules 408 can be used to determine whether the user, machine, or session associated with the user has sufficient credentials to carry out the request, as well as to specify what actions to take in different situations where the user does not have sufficient credentials. For example, in a consumer transactions database, security rules may state that only each consumer should be able to view their own credit card information in de-tokenized format. If a system administrator requests a list of transactions with all related fields, security rules may be utilized to return the fields which are not protected in de-tokenized format and return the associated credit-card numbers in token format. Alternatively, the security rules can be utilized to instruct the database to return fake, or fictive, numbers for each credit card number. Fictive values can be generated using some algorithm or can be selected from a pool of fictive values. Authorization rules may be used to implement different levels of access for different types of users. For example, only an administrator may have the requisite permissions to update, insert, or delete records in the database, while all other users may have permission only to run queries.

Finally, as discussed earlier, routing rules 409 may be utilized to determine where to forward requests. Routing rules 409 can be as simple as a rule that records the destination database address of an intercepted requested and forwards the re-written request to that address.

Although all the rules are discussed in the framework of the DNR, it is understood that some or all of the functionality of the rules can be implemented by the DNR software agent running on the database. For example, if a user is not authorized to make a request, that assessment may be made at the DNR, which can insert a "not-authorized" token or message into the rewritten request which is sent to the database. At the database, the DNR software agent can read the "not-authorized" token and determine that no action should be taken in response to the request. Additionally, as will be understood by one of ordinary skill in the art, not all of these rules are required to carry out the method of data tokenization disclosed herein.

Figure 5:
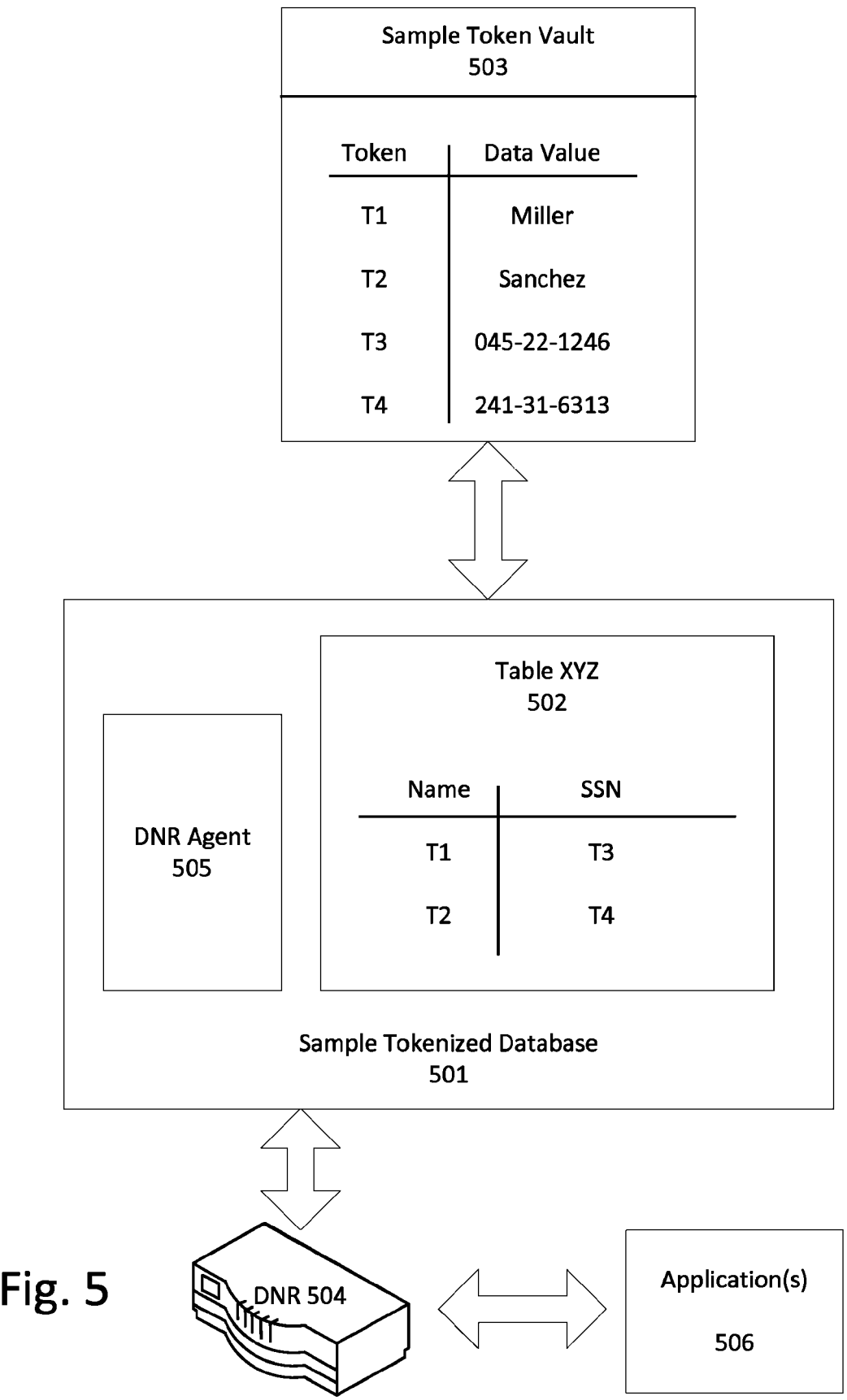
FIG. 5 is a diagram of a sample token vault and sample tokenized database containing a sample table according to a disclosed embodiment.

FIG. 5 illustrates a sample tokenized database 501. Table XYZ 502 in sample database 501 contains a tokenized listing of names and social security numbers. Token values T1, T2, T3, and T4 are provided for illustration only and the actual token values can be any sequence of numbers or alpha-numeric characters that the database owner/administrator or tokenization provider prefers.

Sample database 501 also includes a DNR software agent 505 which implements the commands that are parsed from rewritten requests received via the DNR 504. The DNR agent 505 executing on sample database 501 is in communication with sample token vault 503 which contains the data values corresponding to the token values in the sample tokenized database 501.

The DNR 504 receives database access requests from one or more applications 506 and, after processing/rewriting the requests, forwards the relevant rewritten requests to sample tokenized database 501. Of course, DNR 504 can be in communication with multiple tokenized databases (not shown) and multiple applications at one time, and limited components are shown for illustration and clarity only.

The DNR 504 enables a user (not shown) who is using application 506 to enter and transmit a database access request directed to the sample tokenized database 501 without the application 506 being responsible for the tokenization or de-tokenization. The user can enter database requests the way they ordinarily would be entered, and the application 506 can forward them to the DNR 504, which handles all tokenization and de-tokenization related processing.

The operation of different types of requests and specific examples of each request will now be described with reference to table XYZ 502 in sample tokenized database 501 and sample token vault 503. Although the language in the examples conforms to SQL, it is provided for illustration only, and any query language can be utilized.

If the DNR 504 receives a data retrieval request directed to sample tokenized database 501, it first loads the appropriate rule set for data retrieval requests. After loading the appropriate rule set, it evaluates the data retrieval request and re-writes it so that after it is sent to the sample tokenized database 501, the values to be retrieved are returned in de-tokenized form.

For example, let's say the data retrieval request is as follows:

"SELECT Name FROM Table XYZ"

If this query were run on table XYZ 502 in the sample tokenized database without modification, the result set that would be returned would be:

Name: T1, T2

Of course, this is not the information that the user presumably wants to retrieve with such a query. When the DNR 504 receives this query, the appropriate rule set is used to rewrite the query to:

"SELECT deToken(Name) FROM Table XYZ"

The deToken function indicates to the DNR agent 505 executing on the sample tokenized database 501 to de-tokenized the retrieved values before transmitting the result set back to the DNR 504. So, using the example of the re-written query, the sample database 501 will execute the re-written query to retrieve the token values in the Name column, and the DNR agent 505 will transmit those token values to the sample token vault 503 to retrieve the actual values, which will then be passed back to the DNR 504.

Although the deToken function is shown taking only one parameter, this is only for the sake of clarity. The deToken function can take multiple parameters. For example, the deToken function can take a parameter including the DNR origin signature for verification so that the DNR agent cannot be accessed directly. The function can take a parameter relating to a particular tokenization scheme that is being used or include a parameter with information relating to a particular user session, such as a user session identification stamp. The function can also include security data relating to what type of values should be returned, as is discussed in greater detail with regard to fictive values.

So the result set that will be transmitted back to the user at application 506 when the query passes through DNR 504 and is re-written prior to being sent to sample tokenized database 501 will be as follows:

Name: Miller, Sanchez

The deToken function can be selectively applied based on security or permissions considerations, and can pass one or more additional variables to the sample database 501. These variations will be discussed with reference to the security and fictive values features further below.

If the DNR 504 receives a data update request directed to sample tokenized database 501, it first loads the appropriate rule set for data update requests. After loading the appropriate rule set, it evaluates the data update request and re-writes it so that after it is sent to the sample tokenized database 501, the values to be added to the tokenized database are in token format and the appropriate token-to-data relationships are stored in the sample token vault.

So if the data update request sent to the sample tokenized database 501 and intercepted by the DNR 504 is:

UPDATE Table XYZ, SET SSN=421-66-4567

Then the rewritten request can read:

UPDATE Table XYZ, SET SSN=Tokenize(421-66-4567)

The Tokenize function can indicate to the DNR agent 505 executing on the sample tokenized database to create a token value for the update data. Although the Tokenize function is shown taking only one parameter, this is only for the sake of clarity. The Tokenize function can take multiple parameters. For example, the Tokenize function can take a parameter including the DNR origin signature for verification so that the DNR agent cannot be accessed directly. The function can take a parameter relating to a particular tokenization scheme to be used or include a parameter with information relating to a particular user session, such as a user session identification stamp. The function can also include security data relating to what type of values should be returned, as is discussed in greater detail with regard to fictive values.

When the DNR agent 505 receives the Tokenize function, it can create a new token for the data value passed in the function, if one does not already exist. Additionally, the DNR agent 505 can then update the relevant portions of table XYZ 502 with the tokenized data value, according to the update request specifications, and send the token-to-data value relationship to the sample token vault 503 for storage. Of course, in practice, many update commands will include a "where" clause to indicate which portions to update. These will be discussed in greater detail with respect to filter values. The Tokenize function can optionally also include a parameter that indicates to the DNR agent whether the token value generated from the data value should be added to the token vault.

Figure 6:
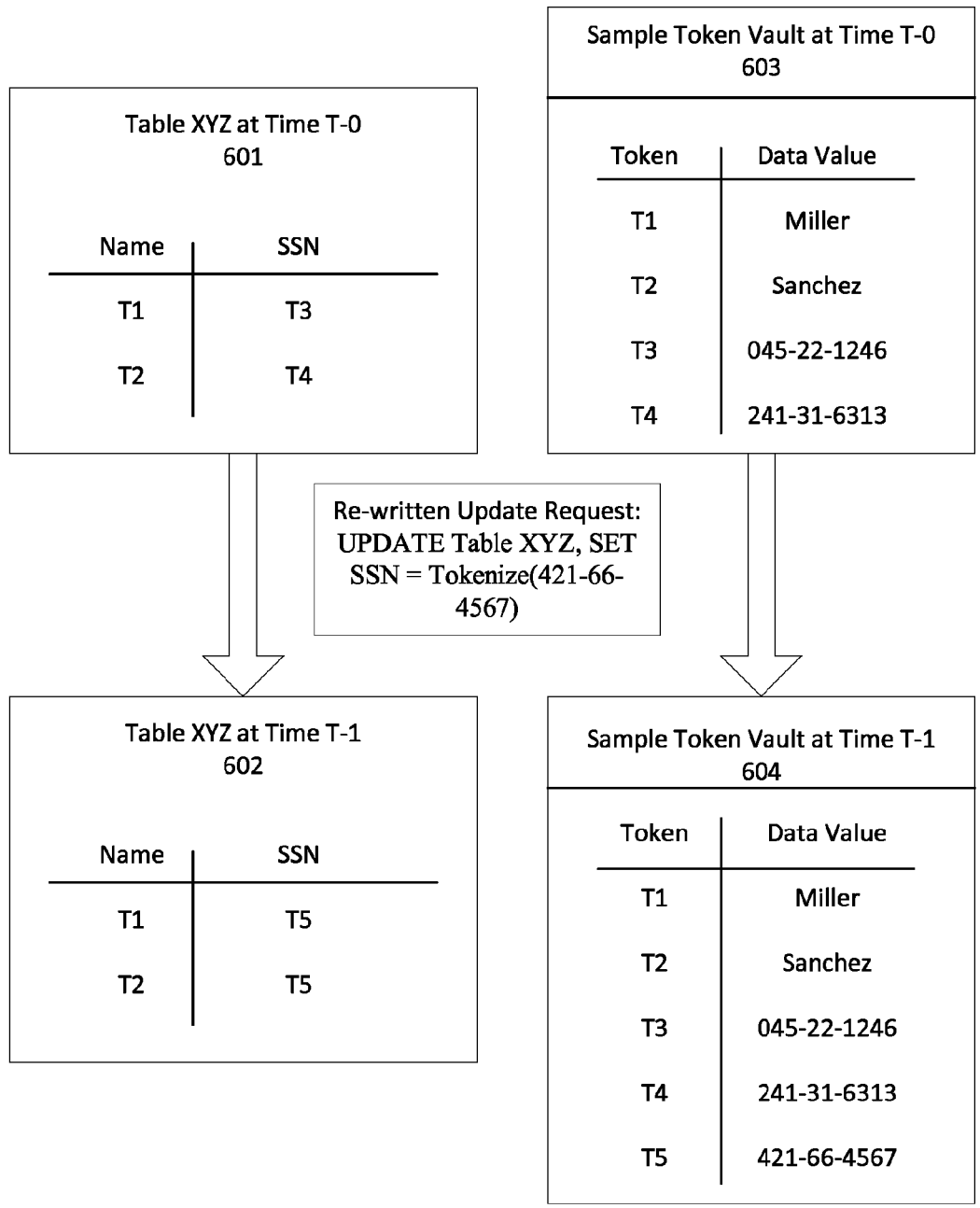
FIG. 6 is a diagram showing the sample token vault and sample table before and after an update request.

Referring now to FIG. 6, the sample token vault is shown at two times, at time T-0 603 before receiving the update request and at time T-1 604 after receiving the update request. Additionally, table XYZ is also shown at the two times T-0 601 and T-1 602.

Using the example of the specific update request discussed above, the changes to both the table XYZ and the token vault will be discussed. Since the update request included a data value which does not already have a corresponding token, the new SSN number "421-66-4567," a new token value needs to be generated for the value. The DNR agent generates the new token "T5" using the appropriate tokenization rule. The tokenization rule can be pre-loaded onto the DNR agent during installation or received at some point after from the token vault, database, or other appropriate source.

After generating the token T5 corresponding to the new number 421-66-4567, the new token and associated data value are stored in the sample token vault 604. Additionally, all of the SSNs for each of the records in table XYZ 602 are updated with the new token T5. As discussed above, this is because the update request did not include a "where" limitation.

Similar to the deToken function, the Tokenize function can be selectively applied based on security or permissions considerations, or can pass one or more additional variables to the sample database. These variations will be discussed with reference to the security and fictive values features further below.

Insert data requests are handled similarly to update data requests, in that the Tokenize function is utilized for the new data. So, for example, if a user wanted to add a record to table XYZ, the record including the social security name of a person with the name "Jackson," the insert request could be written as follows:
INSERT INTO TABLE XYZ, VALUES (Jackson, 162-97-2441)

After this request is intercepted by the DNR and re-written to include the Tokenize command, it can be sent to the sample tokenized database as: INSERT INTO TABLE XYZ, VALUES (Tokenize(Jackson), Tokenize(162-97-2441))

This will alert the DNR agent running on the sample tokenized database to create new token values for each of the new data values and update the database and token vault accordingly.

Figure 7:
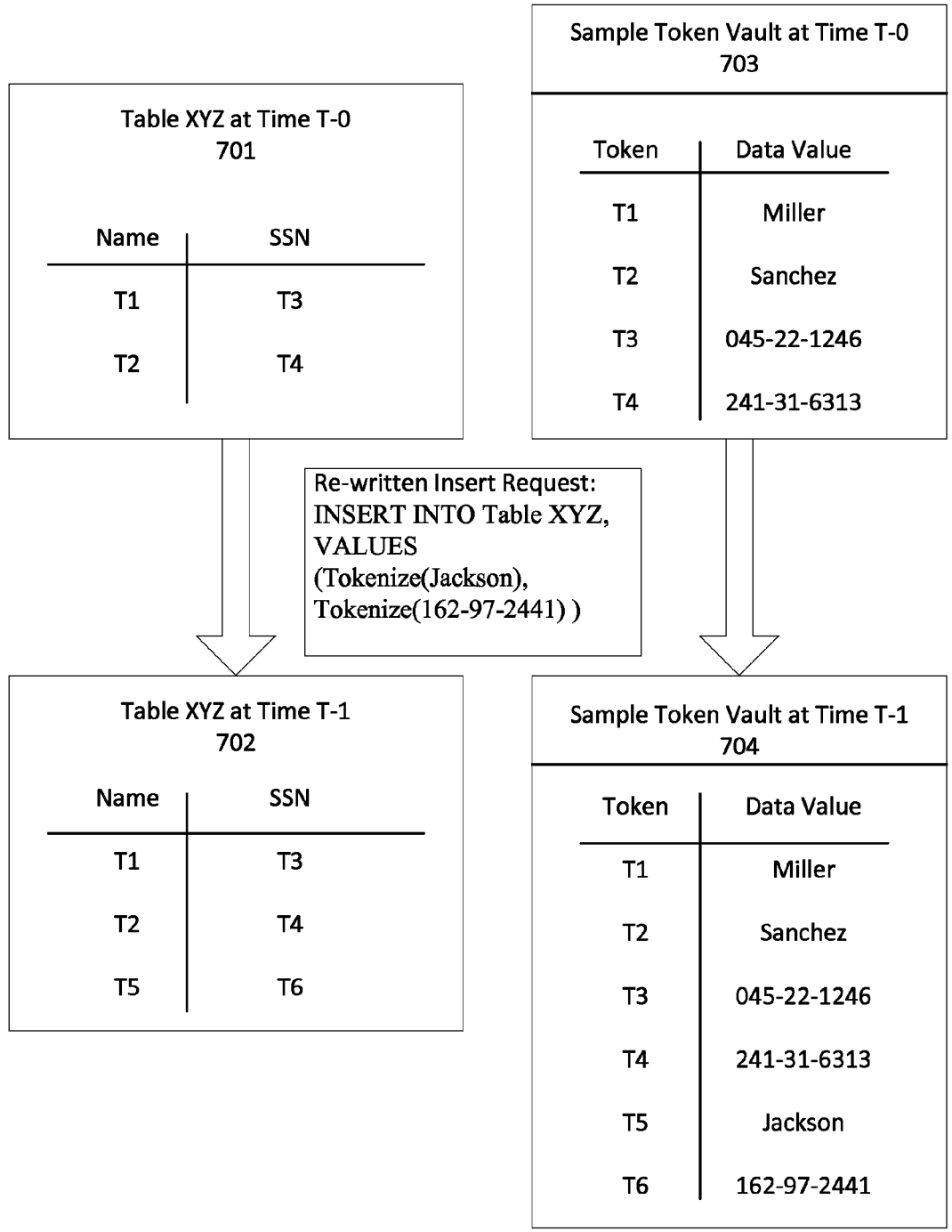
FIG. 7 is a diagram showing the sample token vault and sample table before and after an insert-into request.

Referring to FIG. 7, the result of the insert command listed above is shown. Table XYZ at time T-0 701 represents the table prior to the insert data request being sent to the database and table XYZ at time T-1 702 represents the table after the insert data request is sent. Similarly, token vault at time T-0 703 shows the token vault prior to the insert data request being sent to the database and token vault at time T-1 704 shows the token vault after the insert data request is received at the database. Table XYZ at time T-1 702 and sample token vault at time T-1 704 show the addition of two new tokens, T5 and T6. These two new tokens correspond to the new data values Jackson and 162-97-2441.

Many requests may include filter terms. That is, terms which reduce or filter the scope and size of the data set to which the request applies. Using the earlier example of table XYZ 502 in FIG. 5, a user may have the last name of someone and be interested in retrieving their Social Security Number, but not the SSN's of every person in the table. If the person whose SSN they are looking for has the name "Miller," they would normally transmit the following query to the database to retrieve the SSN of Miller:
SELECT SSN FROM Table XYZ WHERE Name=Miller Of course, if this query were transmitted as-is to the tokenized table XYZ in the tokenized database, the name Miller would not be found and it would return no results, since this query is intended for a non-tokenized database. In order to be compatible with the tokenized database, the query would be re-written by the DNR as:
SELECT deToken(SSN) FROM Table XYZ WHERE Name=Tokenize(Miller)

The first change to the request is in the insertion of the deToken function, as is discussed above with regard to data retrieval requests. The second change to the request is the insertion of the Tokenize function for the filter data value "Miller". This alerts the DNR agent running on the database to look up the token value corresponding to "Miller" and then use that token value as a filter when selecting SSNs.

In this case, the token value corresponding to "Miller" is T1 so the query will result in the selection of the tokenized SSN corresponding to T1, which is T3. The DNR agent will then apply the deToken function to T3 to generate the SSN "045-22-1246," which is returned to the user.

Optionally, the Tokenize function may pass a parameter which indicates whether it associated with an insert data value, update data value, or a filter data value. This may useful to the DNR agent in determining whether a new token is required to be generated for the data value. For example, when the Tokenize function is used with an insert data value or update data value, the DNR agent may check the token vault to see if a token value exists for the data value, and generate a new token value if one does not exist. When the Tokenize function is used with a filter data value, the DNR agent may determine that a new token does not need to be generated, as the filter data values are used to filter a selected set of data values, and are not added to the data tables. In this situation, the DNR agent can just look up the appropriate token value corresponding to the filter data value in the token vault, and if a token value does not already exist, the DNR agent can correctly determine that no records correspond to that filter data value, since a token would have had to have been created for the data value if it was inserted or added to the table earlier. Alternatively, the Tokenize function can be used to create token values for all passed data values that do not already have an associated token value.

In addition to being used with data retrieval commands, filters can be utilized with updates to the data values stored in the database. For example, referring to table XYZ 502 in FIG. 5, a user may wish to update the SSN associated with the name "Sanchez." To do so, they could transmit the request:

UPDATE Table XYZ, SET SSN=123-45-6789 WHERE Name=Sanchez

If the database was not tokenized, this would change the SSN associated with the name "Sanchez" to "123-45-6789." However, since the database is tokenized, the request must be re-written by the DNR as:

UPDATE Table XYZ, SET SSN=Tokenize(123-45-6789) WHERE Name=Tokenize(Sanchez)

The rewritten request instructs the DNR agent to make a new token for the new data value to be added to the database, and to add the token value where the name is equal to the token value T2. As before, the token value corresponding to the name Sanchez is determined by the DNR applying the same tokenization rules as are used by the DNR Agent.

The DNR may handle and re-write additional types of database access requests that are not specifically enumerated here. For example, the user can submit a delete request for a specific data record. Of course, when deleting a record, no tokenization or de-tokenization is required, but the DNR can optionally pass the data by re-writing the request to add a removeToken function which tells the DNR agent to remove not only the record, but the token-to-data relationship from the token vault. Additional types of requests and parameters that can be adapted by the DNR to a tokenized database can include, for example, "select distinct" and "order by" modifiers.

Figure 8:
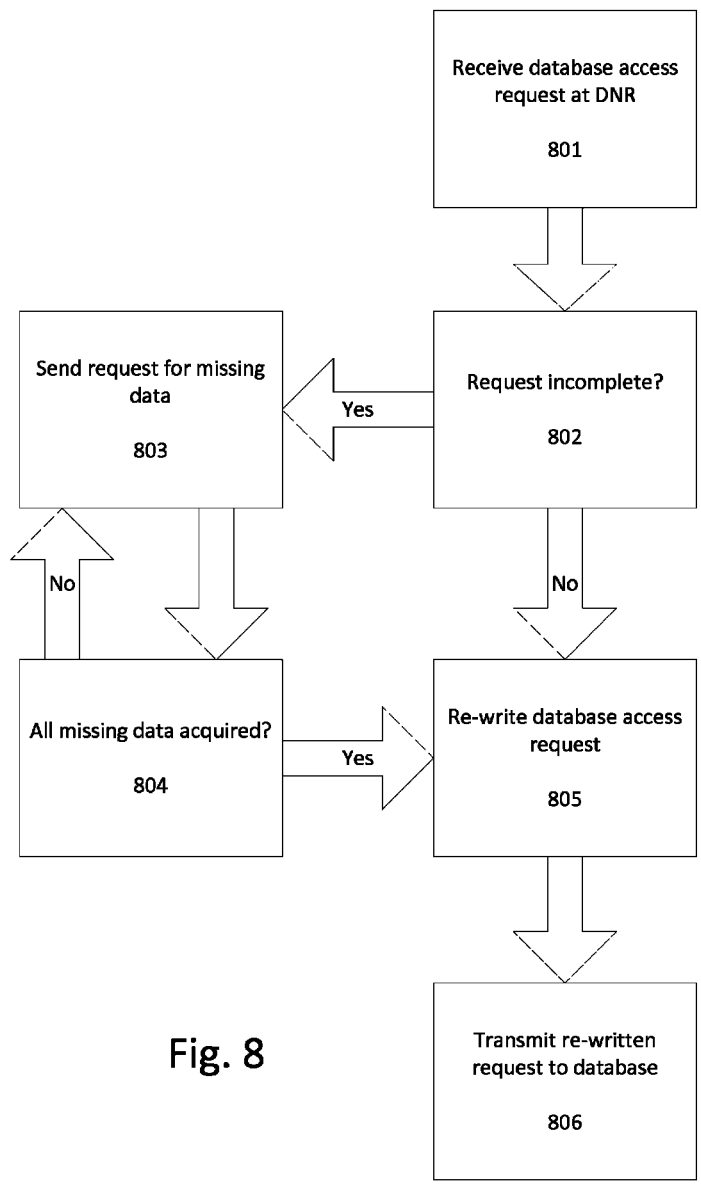
FIG. 8 is a flowchart showing an exemplary method for handling incomplete requests by the DNR according to a disclosed embodiment.

The DNR may have one or more rules for dealing with incomplete requests. Referring to FIG. 8, the DNR may receive a database access request at step 801 and assess whether the request is an incomplete request at step 802. Incomplete requests can be classified as requests which are determined by one or more rules to be lacking necessary information. Using the earlier example of Table XYZ 502 in FIG. 5, the request may be:

SELECT * FROM Table XYZ

In this example, the asterisk, or star-operator is used to indicate that the user wants to select all possible fields in Table XYZ. However, in order to properly utilize the deToken function, the list of actual column names may be required. Therefore the DNR may determine at step 802 that the request is incomplete and proceed to step 803 where it sends out a request for the missing data. The request can be sent to the database, the DNR agent on the database, or some other repository which tracks the column names. Additionally, the missing information may also be stored in some memory on the DNR itself.

So in the above example, the DNR will request a list of all columns that appear in Table XYZ at step 803. This would result in the column identifiers for Name and SSN being received at the DNR. At step 804, the DNR verifies that there is not any additional missing information, and if so, proceeds to step 805. If there is still missing information, then the DNR can send another request to the same or a different source for the missing information.

At step 805, the DNR proceeds to re-write the database access request, not only according to the request based rules, but also to incorporate the missing information that has been retrieved. So in the above example, the request can first be re-written as:

SELECT Name, SSN FROM Table XYZ

After this, the request can further be re-written as:

SELECT deToken(Name), deToken(SSN) FROM Table XYZ

This ensures that the data values in table XYZ, and not the token values, are returned to the user. After the query is re-written, it is sent to the database at step 806.

Figure 9:
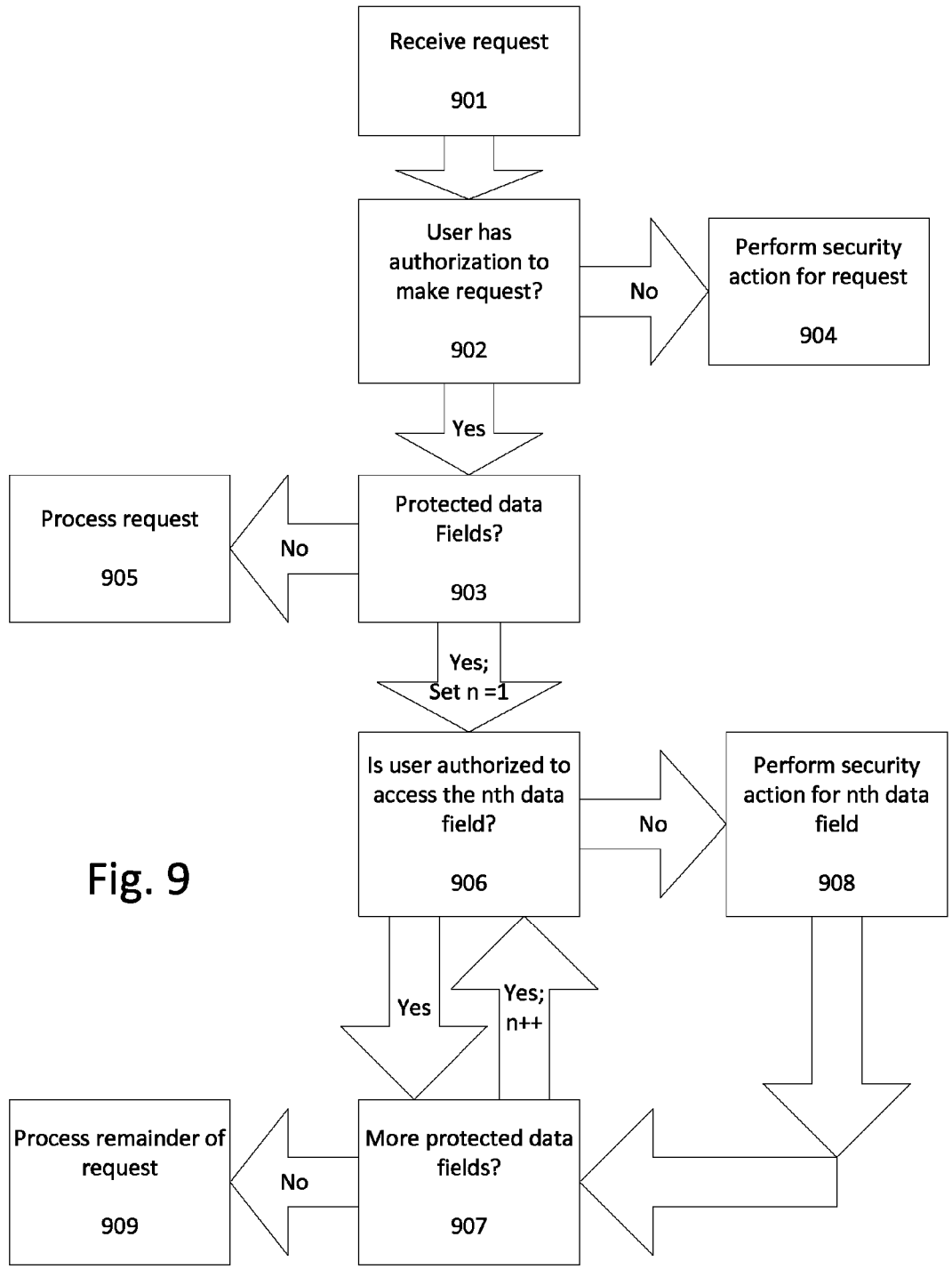
FIG. 9 is a flowchart showing an exemplary method for preventing unauthorized access to a database by the DNR according to a disclosed embodiment.

Referring to FIG. 9, a DNR security process for preventing unauthorized access to a database will now be described. The process may be implemented as one or more security rules that are applied at the DNR as discussed earlier. After the request is receive at step 901, the DNR determines whether the user is authorized to make the request at step 902. This can include determining whether the user is authorized to make any requests, such as checking for an unauthorized system user, as well as checking whether the user is authorized to make a particular kind of request, such as an update request. So, for example, a user who has read-only privileges may be authorized to make a select request but not an update request. In other situations, the user may be determined to be lacking authorization to access the database in any way.

If the user does not have authorization to make the request, at step 904 a security action may be performed by the DNR. The security action can be selected from a variety of possible security actions. For example, the DNR may rewrite the request to set a flag which tells the database to disregard the request if it is an update or insert or to return fictive values if it is a select request. For example, the Tokenize function can be configured to pass multiple variables, one of them being a fictive values flag, such as Tokenize(value, fictive_value?). So if the user is not authorized to make updates and has entered an update request such as:

UPDATE Table XYZ, SET SSN=123-45-6789

Then the rewritten request taking into account the security rules can be:

UPDATE Table XYZ, SET SSN=Tokenize(123-45-6789, true)

This will inform the DNR agent that the values in the Tokenize function are fictive and that the update should be ignored. Similarly, if the request is a select request, the deToken function can pass a fictive values flag. So if a user is unauthorized and has entered a select request such as:

SELECT Name FROM Table XYZ

Then the rewritten request taking into account the security rules would be:

SELECT deToken(Name, true) FROM Table XYZ

This would alert the DNR that fictive values should be returned in response to the select request rather than the real de-tokenized values. This can be accomplished in many ways. For example, a random number generator can use the token value as a seed to generate a fictive value to the return to the user. The fictive value flags in the deToken or Tokenize functions can default to false, but can be changed to true when an unauthorized user is detected.

In addition to having a fictive values flag in the Tokenize and deToken functions, a fictive value function can be utilized to pass the data values. For example, rather than a deToken function being used to pass the data value, a returnFictiveValue function can be used to tell the DNR agent to return a fictive value in response to the data request.

Furthermore, fictive values are not the only way of dealing with unauthorized users or requests. The deToken function can include a flag which tells the DNR agent to return an empty or NULL value when a user is unauthorized, or to return a token value instead of a de-tokenized value. Additionally, the DNR can utilize the security rules to block an update, insert, or select request when the user is unauthorized. Many variations are possible.

If the user does have authorization to make the request, at step 903 the DNR determines whether there are any protected data fields in the request. For example, a table in a database may contain several data fields, and one or more of them may be restricted to only a subset of the users that have access to the database or the table. So, in the previous example of table XYZ, the field "Name" can be a regular data field accessible to all users, whereas the data field "SSN" can be restricted a subset of users such as administrators. Different authorization levels may be utilized with different types of data fields, and the number of authorization levels is not limited to two but may include many tiers of authorizations and associated data fields in a database.

If there are no protected data fields, then at step 905 the request is processed as it normally would be for an authorized user. If there are protected data fields, then at step 906 the DNR examines user authorization levels for each protected data field and determines whether the user has authorization to access that data field in the way that is specified by the request. This may be accomplished by comparing the permissions/authorizations of the user with the permissions/authorization required to perform the function indicated by the request on the protected data field. For example, a protected data field may have a requirement that in order to view any of the data, the user must have "level 5 authorization." If a requesting user has lower than level 5 authorization, then they will be determined to lack authorization for the request on the protected data field. Similarly, the same protected data field may have a requirement that in order to edit any of the data, the user must have "level 7 authorization." In that situation, even a level 5 user who had view access would not be able to successfully change the data in the protected data field. So, using the earlier example of table XYZ, a request that stated "SELECT SSN FROM Table XYZ" may be permitted, whereas a request of "UPDATE Table XYZ, SET SSN=123, 45,6789" by the same user may be unauthorized. Of course, authorization does not have to be organized in levels. For example, authorization can be organized according to a user role, condition, or any other basis for distinguishing between an authorized access and an unauthorized access.

If the user is deemed to not have authorization to access a particular protected data field, then the DNR can perform a security action for that protected data field at step 908. This security action may be similar to the security actions described at step 904, including the fictive values flags, but can apply specifically to the protected data fields that the user is not authorized to access. So, in the example of table XYZ, if a user has authorization to access the Name field but not the SSN field, and submits the request:

SELECT Name, SSN FROM Table XYZ

Then the request can be rewritten to include the fictive values flags as:

SELECT detoken(Name, false), deToken(SSN, true) FROM table XYZ

This re-written request tells the DNR that the deToken function for the Name field should not return fictive values but the actual de-tokenized Name values, and the deToken function for the SSN field should return fictive values. Additionally, as stated earlier, the security action for the unauthorized data field can also include return NULL values for that field, returning token values instead of deTokenized values, or blocking that portion of the request.

At step 907 the DNR determines whether there are additional protected data fields, and if so, returns to step 906 for additional determinations and processing. If there are no further protected data values, then the processing of the remainder of the request continues as normal at step 909.

As used in the security process described above, authorization can refer to many different types of security credentials and authorization schemes. For example, authorization may be based on certain machine identifiers and not specific users, authorizations may be based on the network information of the machine from which the request is received, authorization schemes such as different levels of permissions or privileges may be used, as well as security tokens, certificates or other forms of authentication or authorization. Additionally, although the fictive value flag is discussed as being set to false as the default, the flag may be set to true as the default (e.g. the default value may assume an unauthorized user or request), and may be modified to false when the request authorization is confirmed. Many variations are possible and the security rules are not limited to the specific examples of authentication and authorization disclosed herein.

In addition to receiving and passing data values to the database, the DNR can also receive and pass security tokens or credentials to the database. The DNR may receive a security token with the request from the application. The security token can be a credential such as a password, or a certificate, or some other data which allows the DNR to verify the user and verify that the user is authorized.

The DNR can authenticate or otherwise verify the security token or credential prior to re-writing and send the request to the database. If the security token is valid, the DNR can utilize flags similar to the fictive value flags discussed earlier to indicate to the DNR agent that the request is secure and authorized. For example, the Tokenize (or deToken) function may pass two parameters, one being the data value, and the other indicting the validity of the security token, such as Tokenize(data value, valid_security_credential?).

This security token flag can also be passed in addition to the fictive value flag in some situations. For example, if the security token associated with a user is valid, but the user has inadequate permissions to access a particular data field, then two flags can be passed in addition to the data value in a Tokenize or deToken function.

The security flag can be used by the database or the DNR agent executing on the database to determine how to handle the request. For example, if a deToken function is received with the security flag set to false, then the de-tokenization step may be omitted, resulting in token values being returned to the user. Similarly, if a Tokenize function is received with the security flag set to false, then the DNR agent can ignore the function instead of tokenizing the data value passed with it. So a deToken function such as deToken(Name, fictive_value?, valid_security credential?) can return fictive values for Name if the security credentials are valid but the user does not have adequate permissions to retrieve Names, and not return any values if the security credentials are invalid.

Additionally, the security token/credentials received at the DNR can be passed to the DNR agent as an argument in one of the functions. In this scenario, an assessment of the validity of the security tokens/credentials can be made directly at the DNR agent rather than at the DNR.

Figure 10:
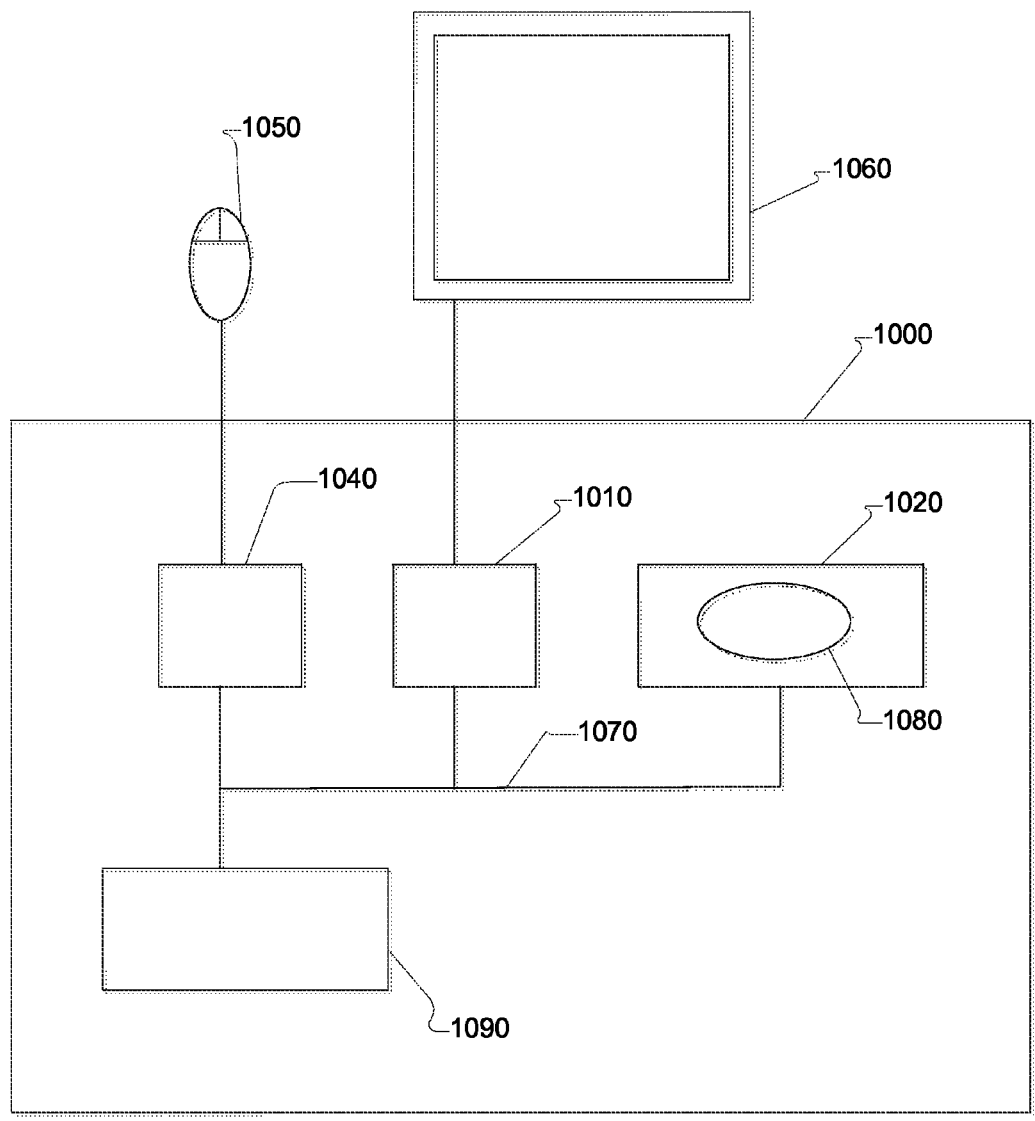
FIG. 10 illustrates an exemplary computing environment that can be used to carry out the method of data tokenization according to a disclosed embodiment.

One or more of the above-described techniques can be implemented in or involve one or more computer systems. FIG. 10 illustrates a generalized example of a computing environment 1000. The computing environment 1000 is not intended to suggest any limitation as to scope of use or functionality of a described embodiment.

With reference to FIG. 10, the computing environment 100 includes at least one processing unit 1010 and memory 1020. The processing unit 1010 executes computer-executable instructions and may be a real or a virtual processor. In a multi-processing system, multiple processing units execute computer-executable instructions to increase processing power. The memory 1020 may be volatile memory (e.g., registers, cache, RAM), non-volatile memory (e.g., ROM, EEPROM, flash memory, etc.), or some combination of the two. The memory 1020 may store software 1080 implementing described techniques.

A computing environment may have additional features. For example, the computing environment 1000 includes storage 1040, one or more input devices 1050, one or more output devices 1060, and one or more communication connections 1090. An interconnection mechanism 1070, such as a bus, controller, or network interconnects the components of the computing environment 1000. Typically, operating system software or firmware (not shown) provides an operating environment for other software executing in the computing environment 1000, and coordinates activities of the components of the computing environment 1000.

The storage 1040 may be removable or non-removable, and includes magnetic disks, magnetic tapes or cassettes, CD-ROMs, CD-RWs, DVDs, or any other medium which can be used to store information and which can be accessed within the computing environment 1000. The storage 1040 may store instructions for the software 1080.

The input device(s) 1050 may be a touch input device such as a keyboard, mouse, pen, trackball, touch screen, or game controller, a voice input device, a scanning device, a digital camera, remote control, or another device that provides input to the computing environment 1000. The output device(s) 1060 may be a display, television, monitor, printer, speaker, or another device that provides output from the computing environment 1000.

The communication connection(s) 1090 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 1000, computer-readable media include memory 1020, storage 1040, communication media, and combinations of any of the above.

Of course, FIG. 10 illustrates computing environment 1000, display device 1060, and input device 1050 as separate devices for ease of identification only. Computing environment 1000, display device 1060, and input device 1050 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 1000 may be a set-top box, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiment shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A database network router apparatus for data tokenization, the apparatus comprising:
   one or more processors; and
   one or more memories operatively coupled to at least one of the one or more processors and having instructions stored thereon that, when executed by at least one of the one or more processors, cause at least one of the one or more processors to:
      receive a request directed to a tokenized database, wherein the tokenized database contains one or more tokenized data values and wherein the request does not include any tokenized data values;
      apply one or more rules to the request;
      rewrite the request based on at least one of the one or more rules, wherein the rewritten request is configured to cause one or more non-tokenized data values specified in the request to be tokenized by a software agent resident on the tokenized database when data is added to the tokenized database as a result of the request and wherein the rewritten request is configured to cause the tokenized database to return non-tokenized data values when data is received from the tokenized database as a result of the request; and
      transmit the rewritten request to the tokenized database.

2. The database network router apparatus of claim 1, wherein applying one or more rules and rewriting the request comprises:
   selecting a retrieval rule when the database access request is a data retrieval request; and
   rewriting the request to insert a de-token command into the request, the de-token command signaling to a software agent resident on the tokenized database to de-tokenize the tokenized data values retrieved as a result of the request prior to transmitting the data values back to the database network router.

3. The database network router apparatus of claim 1, wherein applying one or more rules and rewriting the request comprises:
   selecting an update rule when the request is a data update request, the data update request further comprising one or more new data values; and
   rewriting the request to insert a tokenize command into the request, the tokenize command signaling to a software agent resident on the tokenized database to tokenize the one or more new data values prior to adding them to the tokenized database.

4. The database network router apparatus of claim 1, wherein applying one or more rules and rewriting the request comprises:
   selecting an insert rule when the request is an insert data request, the insert data request further comprising one or more new data values; and
   rewriting the request to insert a tokenize command into the request, the tokenize command signaling to a software agent resident on the tokenized database to tokenize the one or more new data values prior to inserting them into the tokenized database.

5. The database network router apparatus of claim 1, wherein applying one or more rules and rewriting the request comprises:
   selecting a filter terms rule when the request includes one or more filter data values, the one or more filter data values limiting the request to a subset of records related to the one or more filter data values; and
   rewriting the request to insert a tokenize command into the request, the tokenize command signaling to a software agent resident on the tokenized database to tokenize the one or more filter data values prior to the execution of the request on the tokenized database.

6. The database network router apparatus of claim 1, wherein applying the one or more rules and rewriting the request comprises:
   selecting an incomplete request rule when the request is determined to be incomplete;
   transmitting a request for missing data to the tokenized database, wherein the missing data is the incomplete portion of the request;
   receiving the missing data from the tokenized database; and
   rewriting the request to include missing data.

7. The database network router apparatus of claim 1, wherein applying one or more rules and rewriting the request further comprises:
   comparing the authorization level associated with the request with the authorization level required to access one or more data fields in the tokenized database;
   identifying one or more unauthorized data fields in the request based on the comparison;
   for every unauthorized data field in the request, rewriting the request to insert a fictive-data command into the request, the fictive-data command signaling to a software agent resident on the tokenized database to return fictive data values in response to the request if the request is a data retrieval request for data in the unauthorized data field, or to disregard the data values passed to the software agent as fictive values if the request is an update or insert request including data in the unauthorized data field.

8. The database network router apparatus of claim 1, wherein the request includes a security credential and the security credential is transmitted to the tokenized database as part of the rewritten request.

9. A computer-implemented method for data tokenization by one or more computing devices, the method comprising:
   receiving, by the one or more computing devices, a request directed to a tokenized database, wherein the tokenized database contains one or more tokenized data values and wherein the request does not include any tokenized data values;
   applying, by one or more computing devices, one or more rules to the request;
   rewriting, by the one or more computing devices, the request based on at least one of the one or more rules, wherein the rewritten request is configured to cause one or more non-tokenized data values specified in the request to be tokenized by a software agent resident on the tokenized database when data is added to the tokenized database as a result of the request and wherein the rewritten request is configured to cause the tokenized database to return non-tokenized data values when data is received from the tokenized database as a result of the request; and
   transmitting, by the one or more computing devices, the rewritten request to the tokenized database.

10. The computer-implemented method of claim 9, wherein applying one or more rules and rewriting the request comprises:
    selecting, by the one or more computing devices, a retrieval rule when the request is a data retrieval request; and
    rewriting, by the one or more computing devices, the request to insert a de-token command into the request, the de-token command signaling to a software agent resident on the tokenized database to de-tokenize the tokenized data values retrieved as a result of the request prior to transmitting the data values back to the database network router.

11. The computer-implemented method of claim 9, wherein applying one or more rules and rewriting the request comprises:
    selecting, by the one or more computing devices, an update rule when the database access request is a data update request, the data update request further comprising one or more new data values; and
    rewriting, by the one or more computing devices, the request to insert a tokenize command into the request, the tokenize command signaling to a software agent resident on the tokenized database to tokenize the one or more new data values prior to adding them to the tokenized database.

12. The computer-implemented method of claim 9, wherein applying one or more rules and rewriting the request comprises:
    selecting, by the one or more computing devices, an insert rule when the database access request is an insert data request, the insert data request further comprising one or more new data values; and
    rewriting, by the one or more computing devices, the request to insert a tokenize command into the request, the tokenize command signaling to a software agent resident on the tokenized database to tokenize the one or more new data values prior to inserting them into the tokenized database.

13. The computer-implemented method of claim 9, wherein applying one or more rules and rewriting the request comprises:
    selecting, by at least one of the one or more computing devices, a filter terms rule when the request includes one or more filter data values, the one or more filter data values limiting the request to a subset of records related to the one or more filter data values; and
    rewriting, by at least one of the one or more computing devices, the request to insert a tokenize command into the request, the tokenize command signaling to a software agent resident on the tokenized database to tokenize the one or more filter data values prior to the execution of the request on the tokenized database.

14. The computer-implemented method of claim 9, wherein applying the one or more rules and rewriting the request comprises:
    selecting, by the one or more computing devices, an incomplete request rule when the request is determined to be incomplete;
    transmitting, by the one or more computing devices, a request for missing data to the tokenized database, wherein the missing data is the incomplete portion of the request;
    receiving, by the one or more computing devices, the missing data from the tokenized database; and
    rewriting, by the one or more computing devices, the request to include missing data.

15. The computer-implemented method of claim 9, wherein applying one or more rules and rewriting the request further comprises:

comparing, by the one or more computing devices, the authorization level associated with the request with the authorization level required to access one or more data fields in the tokenized database;

identifying, by the one or more computing devices, one or more unauthorized data fields in the request based on the comparison;

for every unauthorized data field in the request, rewriting, by the one or more computing devices, the request to insert a fictive-data command into the request, the fictive-data command signaling to a software agent resident on the tokenized database to return fictive data values in response to the request if the request is a data retrieval request for data in the unauthorized data field, or to disregard the data values passed to the software agent as fictive values if the request is an update or insert request including data in the unauthorized data field.

16. The computer-implemented method of claim 9, wherein the request includes a security credential and the security credential is transmitted to the tokenized database as part of the rewritten request.

17. At least one non-transitory computer-readable medium storing computer-readable instructions that, when executed by one or more computing devices, cause at least one of the one or more computing devices to:

receive a request directed to a tokenized database, wherein the tokenized database contains one or more tokenized data values and wherein the request does not include any tokenized data values;

apply one or more rules to the request;

rewrite the request based on at least one of the one or more rules, wherein the rewritten request is configured to cause one or more non-tokenized data values specified in the request to be tokenized by a software agent resident on the tokenized database when data is added to the tokenized database as a result of the request and wherein the rewritten request is configured to cause the tokenized database to return non-tokenized data values when data is received from the tokenized database as a result of the request; and transmit the rewritten request to the tokenized database.

18. The at least one non-transitory computer-readable medium of claim 17, wherein applying one or more rules and rewriting the request comprises:

selecting a retrieval rule when the request is a data retrieval request; and rewriting the request to insert a de-token command into the request, the de-token command signaling to a software agent resident on the tokenized database to de-tokenize the tokenized data values retrieved as a result of the request prior to transmitting the data values back to the database network router.

19. The at least one non-transitory computer-readable medium of claim 17, wherein applying one or more rules and rewriting the request comprises:

selecting an update rule when the request is a data update request, the data update request further comprising one or more new data values; and rewriting the request to insert a tokenize command into the request, the tokenize command signaling to a software agent resident on the tokenized database to tokenize the one or more new data values prior to adding them to the tokenized database.

20. The at least one non-transitory computer-readable medium of claim 17, wherein applying one or more rules and rewriting the request comprises:

selecting an insert rule when the request is an insert data request, the insert data request further comprising one or more new data values; and rewriting the request to insert a tokenize command into the request, the tokenize command signaling to a software agent resident on the tokenized database to tokenize the one or more new data values prior to inserting them into the tokenized database.

21. The at least one non-transitory computer-readable medium of claim 17, wherein applying one or more rules and rewriting the request comprises:

selecting a filter terms rule when the request includes one or more filter data values, the one or more filter data values limiting the request to a subset of records related to the one or more filter data values; and rewriting the request to insert a tokenize command into the request, the tokenize command signaling to a software agent resident on the tokenized database to tokenize the one or more filter data values prior to the execution of the request on the tokenized database.

22. The at least one non-transitory computer-readable medium of claim 17, wherein applying one or more rules and rewriting the request comprises:

selecting an incomplete request rule when the request is determined to be incomplete;

transmitting a request for missing data to the tokenized database, wherein the missing data is the incomplete portion of the request;

receiving the missing data from the tokenized database; and rewriting the request to include missing data.

23. The at least one non-transitory computer-readable medium of claim 17, wherein applying one or more rules and rewriting the request further comprises:

comparing the authorization level associated with the request with the authorization level required to access one or more data fields in the tokenized database;

identifying one or more unauthorized data fields in the request based on the comparison;

for every unauthorized data field in the request, rewriting the request to insert a fictive-data command into the request, the fictive-data command signaling to a software agent resident on the tokenized database to return fictive data values in response to the request if the request is a data retrieval request for data in the unauthorized data field, or to disregard the data values passed to the software agent as fictive values if the request is an update or insert request including data in the unauthorized data field.

24. The at least one non-transitory computer-readable medium of claim 17, wherein the request includes a security credential and the security credential is transmitted to the tokenized database as part of the rewritten request.

* * * * *